Patented Oct. 28, 1952

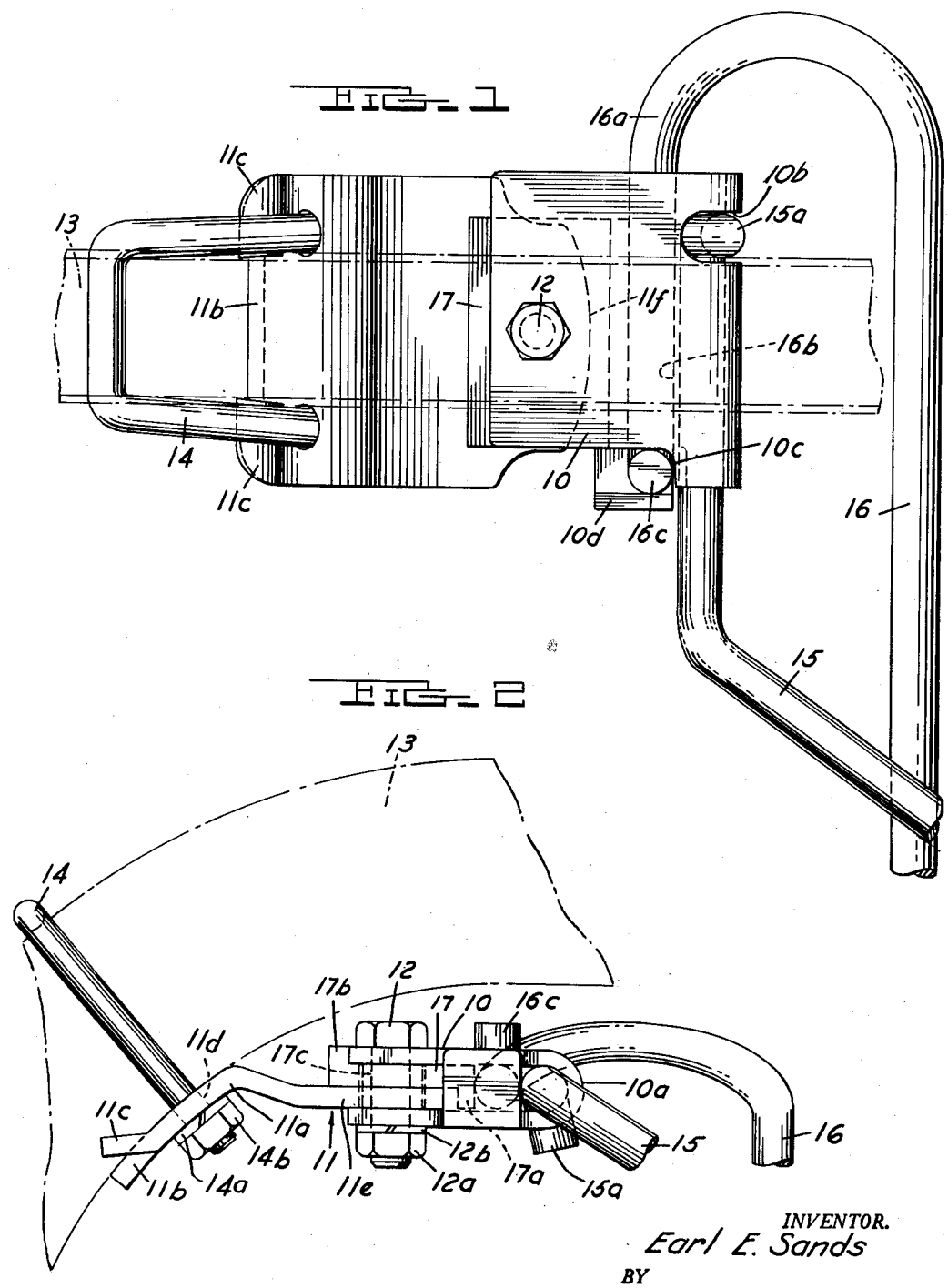

2,615,382

UNITED STATES PATENT OFFICE 2,615,382

WEEDHOOK FOR PLOWS

Earl E. Sands, Detroit, Mich., assignor to Dearborn Motors Corporation, Highland Park, Mich., a corporation of Delaware Application May 6, 1950, Serial No. 160,418

3 Claims. (Cl. 97—193)

This invention relates to an improved weed hook for plows and more particularly to the mounting means for such weed hooks.

Various forms of weed hooks have been utilized heretofore to fold under tall grasses, weeds, or stubble when plowing so that the furrow slice will completely cover such vegetation. While these devices work with a reasonable degree of satisfaction, many of them were cumbersome and of rather complicated construction resulting in an expensive unit to produce. Furthermore, many of these devices did not permit backing up of the tractor without serious damage to the weed hook.

Accordingly, it is an object of this invention to provide a simple and economically manufacturable mounting device for weed hooks for plows which permits limited pivotal movement of the weed hook.

A particular object of this invention is to provide a weed hook mounting which may be fabricated in entirety by stamping operations on sheet metal.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a plan view showing the weed hook mounted on a plow beam.

Figure 2 is a side view of Figure 1.

As shown on the drawings:

In Figure 1 there is shown in assembled relation a pair of weed hooks pivotally mounted in a clevis member 10 constructed in accordance with this invention. Clevis member 10 (to be later described in detail) is secured to a bracket 11 by a bolt 12 and bracket 11 in turn, is secured to a plow beam 13 by a U-bolt 14. Bracket 11 comprises essentially a strap member having a body portion 11a which is arcuately shaped to fit underneath the curved portion of plow beam 13 as shown in Figure 2. Bracket 11 is substantially wider than plow beam 13 and a notch 11b of the same width as beam 13 is provided in the rear end of body portion 11a of bracket 11. The end portions 11c adjacent notch 11b are bent upwardly as shown in Figure 2 to lie against the respective side surface of plow beam 13, and thus further anchor bracket 11 to the plow beam. A pair of spaced transverse holes 11d are provided in the body portion 11a of bracket 11 and such holes are located adjacent the respective side surfaces of plow beam 13 to admit the respective legs of U-bolt 14. The washer 14a surrounding each leg of U-bolt 14 is placed adjacent the bottom surface of body portion 11a and a nut 14b is threaded on to each end of U-bolt 14 whereby body portion 11a of bracket 11 is secured tightly against the underside of plow beam 13.

An integral, horizontally disposed, forwardly projecting arm 11e is formed on body portion 11a as shown in Figures 1 and 2. The forward edge 11f of arm 11e is arcuately shaped for a purpose to be later explained.

As previously mentioned, clevis 10 is pivotally secured to the forward end of arm portion 11e of bracket 11 by bolt 12. Clevis 10 comprises a U-shaped stamping having an arcuate, forwardly disposed bight portion 10a. The bight portion 10a rotatably accommodates a cylindrical end of a rod-like weed hook 15, such weed hook snugly but rotatably fitting within the bight portion of clevis 10. Weed hook 15 is provided with a bent end 15a formed at right angles to the axis of the cylindrical end of weed hook 15 and such bent end fits within a slot 10b provided in the bight portion 10a near the upper edge of clevis 10 as shown in Figure 1. The bent end 15a of weed hook 15 then cooperates with the walls of slot 10b to retain weed hook 15 against lateral displacement as well as to limit pivotal movement of weed hook 15 to about 90°.

A second weed hook 16 provided with reversely bent end 16a terminating in a cylindrical bearing portion 16b is rotatably mounted within clevis 10 adjacent weed hook 15, the bearing portion 16b of weed hook 16 being disposed within clevis 10. The extreme end of bearing portion 16b is bent at right angles as shown at 16c. Weed hook 16 is mounted within clevis 10 so that the bent end 16c is disposed on the side of clevis 10 opposite to that of the bent end 15a of weed hook 15. A portion of the top part of clevis 10 is cut away to provide a shoulder 10c having an arcuate corner against which the upturned end 16c of weed hook 16 abuts whereby the pivotal movement of such weed hook is limited. A tab 10d is provided on the bottom portion of clevis 10. The end of tab 10d is bent upwardly at right angles to the clevis and such tab is then disposed adjacent the upturned end 16c of weed hook 16 thereby limiting the lateral displacement of such weed hook, as well as limiting the pivotal movement to about 90°.

The bearing portion 16b of weed hook 16 is positioned by a spacer 17 closely against the portion of weed hook 15 within the bight portion of clevis 10. Spacer 17 comprises a substantially rectangular member having a thickened transverse rib 17a on the forward edge thereof which traverses the space between the opposed walls of clevis 10 and abuts bearing portion 16b of weed hook 16. A similar but upwardly projecting rib 17b is provided on the back edge of spacer 17 which abuts the upper edge of clevis 10. The main body portion of spacer 17 rests on top of bracket arm 11e and a vertically disposed hole 17c is provided in such spacer to receive bolt 12. A nut 12a and lock washer 12b are applied to bolt 12 but are not tightened sufficiently to prevent pivotal movement of clevis 10 about bolt 12. Thus, the arm 11e and spacer 17 maintain the arms of U-shaped clevis 10 in properly spaced relationship. Transverse rib 17a is spaced somewhat from the arcuate end 11f of arm 11e to permit limited pivotal movement of clevis 10 about bolt 12.

In some cases it may be desirable to employ only a single weed hook. The described mounting construction may be conveniently employed in such event by merely substituting a dummy piece for the missing weed hook which conforms in configuration to the mounting end portion of the missing weed hook. The remaining weed hook will then be as securely positioned as before and will function entirely independently on the substitution of the dummy mounting portion of the missing weed hook.

Since weed hooks 15 and 16 are freely pivoted as above described, the possibility of breakage of the tines when the tractor is backed up without raising the plow bottom is minimized. Furthermore, the pivotal movement of the weed tines is very advantageous when encountering some solid obstruction in plowing, permitting the tines to slide up and over such obstruction. The limited pivotal movement of clevis 10 about bolt 12 still further protects the tines against damage by permitting such tines to rotate slightly as when backing up whereby the tines will be in a better position to rotate upwardly and out of the way.

From the foregoing description, it is clearly apparent that there is here provided a stamped bracket construction for mounting weed hooks on a plow beam which is relatively inexpensive to produce, yet one which is of sturdy construction to withstand the hard usage such a device usually receives in plowing. The simple and unique arrangement for limiting the pivotal movement of the weed tines is not only positive in its operation but is readily produced without complicating the manufacturing operations.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In combination with a pair of plow weed hooks each having a cylindrical mounting portion and a bent end adjacent said mounting portion, a generally U-shaped stamping having a curved bight portion, said mounting portion of one of said weed hooks being insertable in said stamping to lie in contiguous relation to the inner surface of said bight portion, said bight portion having a transverse slot therein receiving said bent end of said one weed hook to limit pivotal movement of said one weed hook, said mounting portion of said other weed hook being inserted in said U-shaped stamping adjacent to said one weed hook, a tab formed on the edge of said stamping and cooperable with the bent end of said other weed hook to limit pivotal movement thereof, and means insertable in said stamping for retaining said week hooks therein and for mounting said stamping to a plow.

2. In combination with a pair of plow weed hooks each having a rod-like mounting portion terminating in a bent end, a generally U-shaped stamping having a curved bight portion, said mounting portions of said weed hooks being insertable in said stamping in side by side relationship with one of said mounting portions disposed in contiguous relationship to the inner surface of said bight portion, means on said stamping respectively cooperating with the bent ends of said weed hooks to limit pivotal movements of said weed hooks relative to said stamping, a mounting plate having one end thereof inserted between the wall portions of said stamping, a spacer inserted between said mounting plate and one of the wall portions of said stamping and having one surface thereof lying adjacent to the outermost inserted weed hook to retain the weed hooks within said stamping, and a single bolt passing therethrough the opposed wall portions of said stamping, said mounting plate and said spacer.

3. In combination with a pair of plow weed hooks each having a cylindrical mounting portion terminating in a bent end, a generally U-shaped stamping having a curved bight portion, said mounting portions of said weed hooks being insertable in said stamping in side by side relationship with one of said mounting portions lying contiguous to the inner surface of said bight portion, said bight portion having a transverse slot therein receiving said bent end of said one weed hook to limit pivotal movement of said one weed hook, a tab formed on the edge of said stamping and cooperating with the bent end of said other weed hook to limit pivotal movement thereof, a mounting plate having one end thereof inserted between the wall portions of said stamping, a spacer inserted between said mounting plate and one of the wall portions of said stamping and having one surface thereof lying adjacent to the said other inserted weed hook to retain the weed hooks within said stamping, and a single bolt passing through the opposed wall portions of said stamping, said mounting plate and said spacer.

EARL E. SANDS.

REFERENCES CITED

The following references are of record in the file of this patent:

UNITED STATES PATENTS

| Number | Name | Date |
|---|---|---|
| 244,805 | Hall | July 26, 1881 |
| 587,761 | Sharp | Aug. 10, 1897 |
| 1,015,756 | Donald | Jan. 23, 1912 |
| 1,223,065 | Meyer | Apr. 17, 1917 |
| 1,237,281 | Behringer | Aug. 21, 1917 |
| 1,427,649 | Silver | Aug. 29, 1922 |
| 1,896,566 | Tegtmeyer | Feb. 7, 1933 |